US009242606B2

(12) United States Patent
Mambourg

(10) Patent No.: US 9,242,606 B2
(45) Date of Patent: Jan. 26, 2016

(54) EXTERIOR MIRROR ASSEMBLY WITH ACTUATOR

(71) Applicant: MAGNA MIRRORS OF AMERICA, INC., Holland, MI (US)

(72) Inventor: Joseph R. Mambourg, Muskegon, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 135 days.

(21) Appl. No.: 14/074,222

(22) Filed: Nov. 7, 2013

(65) Prior Publication Data

US 2014/0133044 A1    May 15, 2014

Related U.S. Application Data

(60) Provisional application No. 61/724,582, filed on Nov. 9, 2012.

(51) Int. Cl.
*B60R 1/072* (2006.01)

(52) U.S. Cl.
CPC ....................... *B60R 1/072* (2013.01)

(58) Field of Classification Search
CPC ........ B60R 1/066; B60R 1/072; B60R 1/076; G02B 7/1822; G02B 7/1827
USPC .......... 359/841, 843, 844, 871, 872, 875, 877
See application file for complete search history.

(56) References Cited

U.S. PATENT DOCUMENTS

| 4,202,603 | A | * | 5/1980 | Miyauchi ....................... 359/874 |
|---|---|---|---|---|
| 4,341,444 | A | * | 7/1982 | Stelma ........................... 359/874 |
| 4,572,626 | A | * | 2/1986 | Suzuki ........................... 359/874 |
| 4,693,571 | A | * | 9/1987 | Kimura et al. ................. 359/874 |
| 5,467,230 | A | * | 11/1995 | Boddy et al. ................... 359/874 |
| 5,701,211 | A | * | 12/1997 | Perry et al. ..................... 359/873 |
| 5,703,731 | A | | 12/1997 | Boddy et al. |
| 5,900,999 | A | | 5/1999 | Huizenga et al. |
| 5,986,364 | A | | 11/1999 | Bingle et al. |
| 6,213,612 | B1 | | 4/2001 | Schnell et al. |
| 6,229,226 | B1 | | 5/2001 | Kramer et al. |
| 6,243,218 | B1 | | 6/2001 | Whitehead |
| 6,312,135 | B1 | | 11/2001 | Polzer |
| 6,315,419 | B1 | | 11/2001 | Platzer |
| 6,362,548 | B1 | | 3/2002 | Bingle et al. |
| 6,467,920 | B2 | | 10/2002 | Schnell et al. |
| 6,522,451 | B1 | | 2/2003 | Lynam |
| 6,685,864 | B2 | | 2/2004 | Bingle et al. |
| 6,698,905 | B1 | | 3/2004 | Whitehead |
| 6,717,712 | B2 | | 4/2004 | Lynam et al. |

(Continued)

*Primary Examiner* — Frank Font

(74) *Attorney, Agent, or Firm* — Gardner, Linn, Burkhart & Flory, LLP

(57) ABSTRACT

An exterior mirror assembly for a vehicle includes a mounting portion mountable at a side of a vehicle, a mirror head portion at the mounting portion, and an actuator. The mirror head portion includes a mirror casing and a reflective element at least partially housed at the mirror casing. The actuator is operable to impart pivotal movement of the reflective element mirror relative to the mirror casing to adjust a rearward field of view of a driver of the vehicle. The actuator includes a drive post that is pivotally attached at the reflective element. The actuator also includes a motor that rotatably drives a clutch device to adjust the drive post to adjust the reflective element relative to the mirror casing. The clutch device allows for manual adjustment of the reflective element and the drive post in a non-ratcheting manner.

19 Claims, 11 Drawing Sheets

(56) References Cited

U.S. PATENT DOCUMENTS

| | | |
|---|---|---|
| 6,755,544 B2 | 6/2004 | Schnell et al. |
| 6,916,100 B2 | 7/2005 | Pavao |
| 7,073,914 B2 | 7/2006 | Pavao |
| 7,080,914 B1 | 7/2006 | Boddy |
| 7,093,946 B2 | 8/2006 | Barve et al. |
| 7,097,312 B2 | 8/2006 | Platzer |
| 7,104,663 B2 | 9/2006 | Whitehead |
| 7,126,456 B2 | 10/2006 | Boddy et al. |
| 7,159,992 B2 | 1/2007 | Foote |
| 7,195,381 B2 | 3/2007 | Lynam et al. |
| 7,255,451 B2 | 8/2007 | McCabe et al. |
| 7,267,449 B1 | 9/2007 | Boddy et al. |
| 7,314,285 B2 | 1/2008 | Ruse et al. |
| 7,722,199 B2 | 5/2010 | DeWard et al. |
| 7,748,856 B2 | 7/2010 | Zhao |
| 8,786,704 B2 | 7/2014 | Foote et al. |
| 8,915,601 B2 | 12/2014 | Foote et al. |
| 2005/0099710 A1* | 5/2005 | Ro .................................. 359/872 |
| 2005/0128612 A1* | 6/2005 | Ro .................................. 359/879 |
| 2007/0002477 A1 | 1/2007 | Whitehead et al. |
| 2009/0021034 A1* | 1/2009 | Tilg et al. .................... 296/1.11 |
| 2011/0194203 A1* | 8/2011 | Foote et al. .................... 359/876 |
| 2013/0107386 A1 | 5/2013 | Sobecki et al. |
| 2014/0376119 A1 | 12/2014 | Sobecki et al. |
| 2015/0097955 A1 | 4/2015 | De Wind et al. |

\* cited by examiner

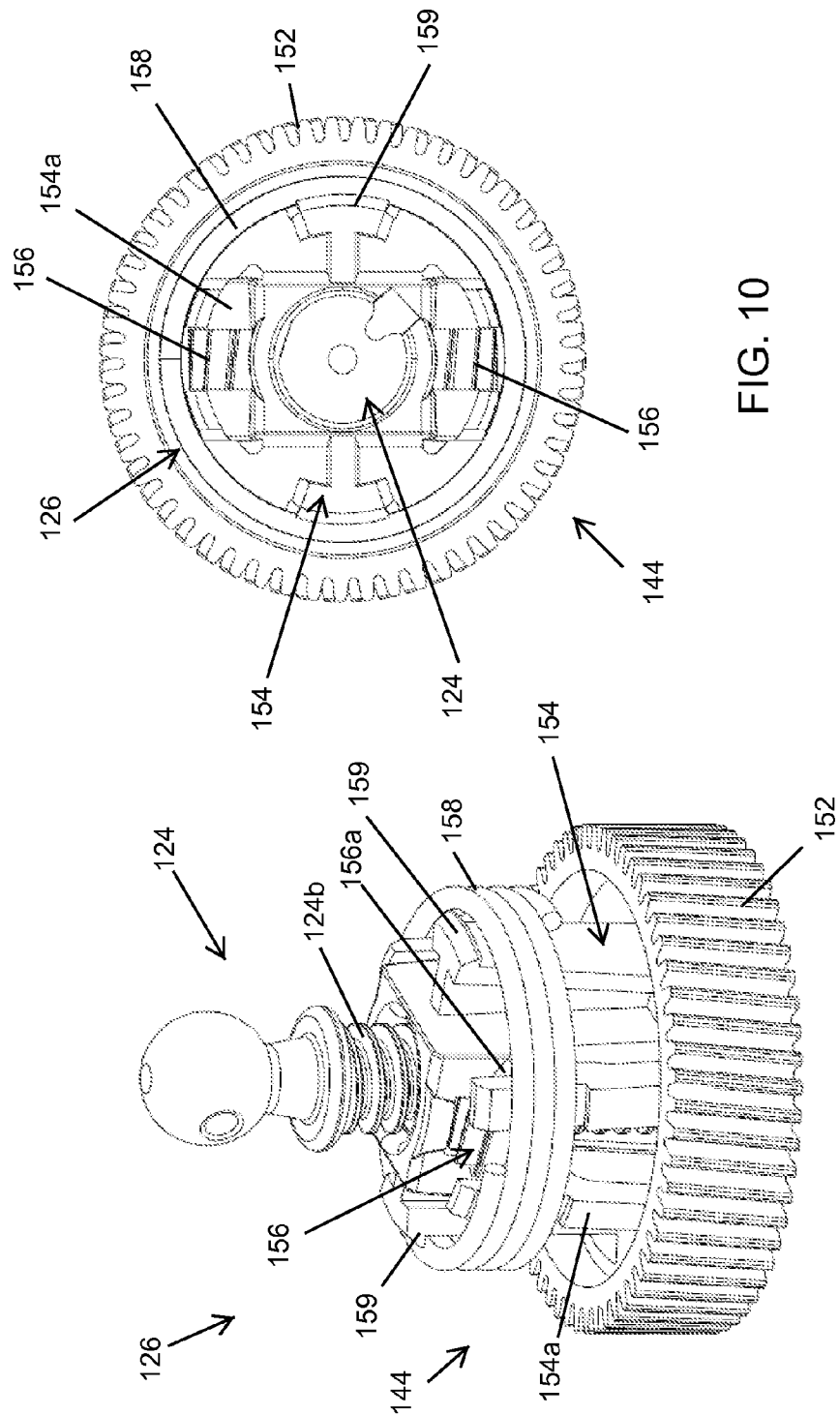

US 9,242,606 B2

EXTERIOR MIRROR ASSEMBLY WITH ACTUATOR

CROSS REFERENCE TO RELATED APPLICATION

The present application claims the filing benefits of U.S. provisional application Ser. No. 61/724,582, filed Nov. 9, 2012, which is hereby incorporated herein by reference in its entirety.

FIELD OF THE INVENTION

The present invention relates generally to exterior rearview mirror assemblies and, more particularly, to an exterior rearview mirror assembly that is adjustable relative to the side of the vehicle to which it is mounted.

BACKGROUND OF THE INVENTION

It is known to provide a vehicular exterior rearview mirror assembly that has a mirror head having a mirror casing with the mirror reflective element adjustable relative to the mirror casing via a mirror reflective element actuator. Examples of mirror reflective element actuators are described in U.S. Pat. Nos. 7,722,199; 7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, which are hereby incorporated herein by reference in their entireties.

SUMMARY OF THE INVENTION

The present invention provides an exterior rearview mirror assembly that has a mirror head portion having a reflective element and mirror casing, with the reflective element being adjustable relative to the mirror casing via an actuator (such as a manually operated actuator or an electrically powered actuator) that moves or pivots the reflective element responsive to a user input so as to adjust the rearward field of view of the driver of the vehicle.

According to an aspect of the present invention, an exterior rearview mirror assembly for a vehicle includes a mirror head portion, a reflective element supported at or fixedly attached at or to the mirror head portion, and an actuator. The actuator is operable to impart pivotal movement of the mirror reflective element relative to the housing or casing of the mirror head portion to adjust the reflective element relative to the side of the vehicle to which the mounting portion is mounted. The actuator comprises non-ratcheting clutches that drive or move respective drive screws responsive to an electronic user input while allowing for manual adjustment of the mirror reflective element in a quiet, non-ratcheting manner.

These and other objects, advantages, purposes and features of the present invention will become apparent upon review of the following specification in conjunction with the drawings.

BRIEF DESCRIPTION OF THE DRAWINGS

FIG. 9 is a perspective view of another clutch assembly of the present invention;

FIG. 10 is a plan view of the clutch assembly of FIG. 9;

DESCRIPTION OF THE PREFERRED EMBODIMENTS

Figure 1:
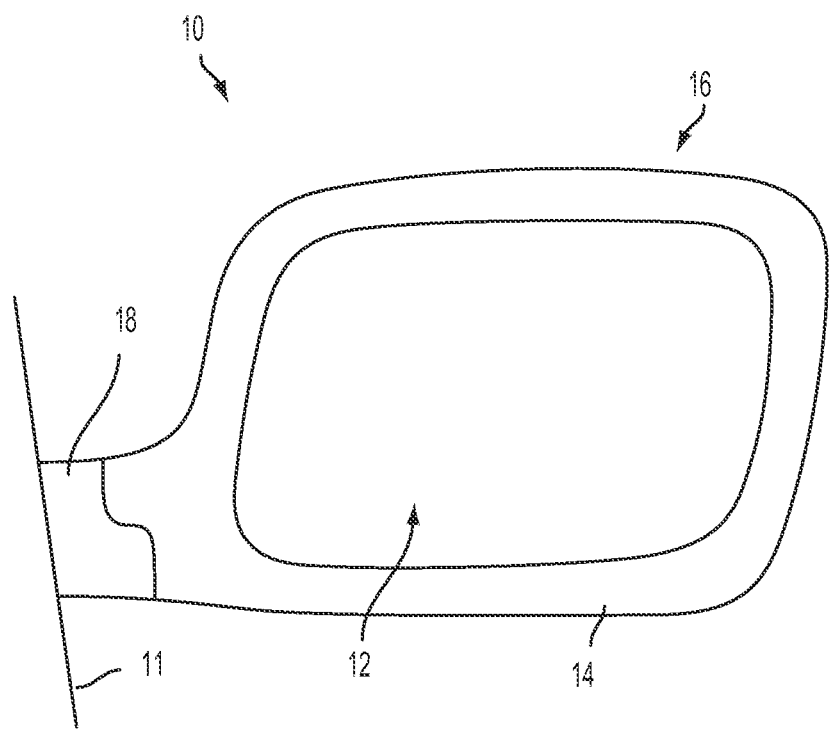
FIG. 1 is a rear elevation of an exterior rearview mirror assembly in accordance with the present invention.

Referring now to the drawings and the illustrative embodiments depicted therein, an exterior rearview mirror assembly 10 for a vehicle 11 includes a mirror reflector or reflective element 12 received in and/or supported at or by a mirror shell or casing 14 of the mirror head portion 16, which may be fixedly mounted at a mounting arm or base or portion 18 attached at the side of the vehicle or that may be movably mounted at the mounting arm or base or portion 18 attached at the side of the vehicle (FIG. 1). Mirror assembly 10 includes a mirror actuator 20 (FIGS. 4 and 5) disposed in head portion 16 that is operable to adjust the reflective element 12 relative to the mirror casing 14 to adjust the rearward field of view of the driver of the vehicle, such as in response to a user input. The mirror actuator 20 comprises a pair of electrically powered motors 22 that rotatably drive respective drive screws 24 that attach at the rear of the reflective element 12 to pivot the reflective element relative to the mirror casing 14, and the actuator includes a non-ratcheting clutch assembly or mechanism 26 that is rotatably driven by the motors 22 to move or drive respective drive screws 24 responsive to an electronic user input, while allowing for manual adjustment of the mirror reflective element in a quiet, non-ratcheting manner, as discussed below.

Mounting base or portion or arm 16 is fixedly mounted at a side portion of a vehicle, and may comprise any suitable base or mount, such as an elongated arm or body or member that extends outwardly from a vehicle attachment end, with the head portion 14 being fixedly or pivotally or adjustably disposed at an outer or mirror attachment end of mounting base or arm 16. The mirror head portion 14 is attached at the mounting base 16 via any suitable means. Optionally, the mirror head portion 14 may house or support one or more mirror or vehicle accessories, such as exterior lights or blind spot indicators or turn signal indicators or the like (such as those discussed below), while remaining within the spirit and scope of the present invention.

The reflective element is attached at a mounting plate or backing plate that is adjustably mounted or disposed in the mirror casing (such as by pivotal attachment of the backing plate at the ends of the drive screws of the actuator) and that is adjustable via the powered mirror reflective element adjustment actuator 20 to allow for adjustment of the mirror reflective element relative to the mirror casing to establish a desired rearward field of view to the driver of the vehicle. Reflective element 12 may comprise a single pane reflective element or an electro-optic reflective element (such as an electrochromic reflective element) with front and rear substrates and an electro-optic medium sandwiched therebetween, such as discussed below. Optionally, the reflective element may have a fillet or rounded edge or radius established around its perimeter edge, such as to meet safety regulations is exposed, and may not include a bezel portion that encompasses the perimeter edge of the reflective element when the reflective element is attached to the mirror head portion 14 (such as described in U.S. patent application Ser. No. 13/023,747, filed Feb. 9, 2011, now U.S. Pat. No. 8,915,601, which is hereby incorporated herein by reference in its entirety).

It is known to have an exterior mirror assembly for mounting at a side of a vehicle that includes a motorized actuator for adjusting the reflective element relative to the vehicle so as to adjust the rearward field of view of the driver of the vehicle. The actuator has an attaching portion that attaches at the rear of the reflective element and that is pivotally mounted at a base or housing, which typically includes two adjustable posts that are individually extendable and retractable to impart pivotal movement of the attaching portion and the reflective element when the respective motors of the actuator are actuated. Examples of known reflective element actuators are described in U.S. Pat. Nos. 7,722,199; 7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, and/or U.S. patent application Ser. No. 11/504,353, filed Aug. 15, 2006 and published Jan. 4, 2007 as U.S. Publication No. 2007/002477, which are hereby incorporated herein by reference in their entireties).

Typically, mirror or reflective element actuators must be capable of manual adjustment in case of power or motor failures. Thus, a reflective element actuator for an exterior rearview and/or sideview mirror assembly may include a clutch mechanism that allows for manual adjustment of the reflective element, such as by a person pressing against the reflective element at an outboard or perimeter region of the reflective element. For example, a typical clutch mechanism may include a spring-loaded nut disposed around a drive screw that is rotatably driven to move inwards and outwards relative to the nut and that is pivotally mounted at the adaptor plate of the actuator that attaches at the rear of the mirror reflective element such that inward and outward movement of the drive screw adjusts the plane of the reflective element.

Figure 3:
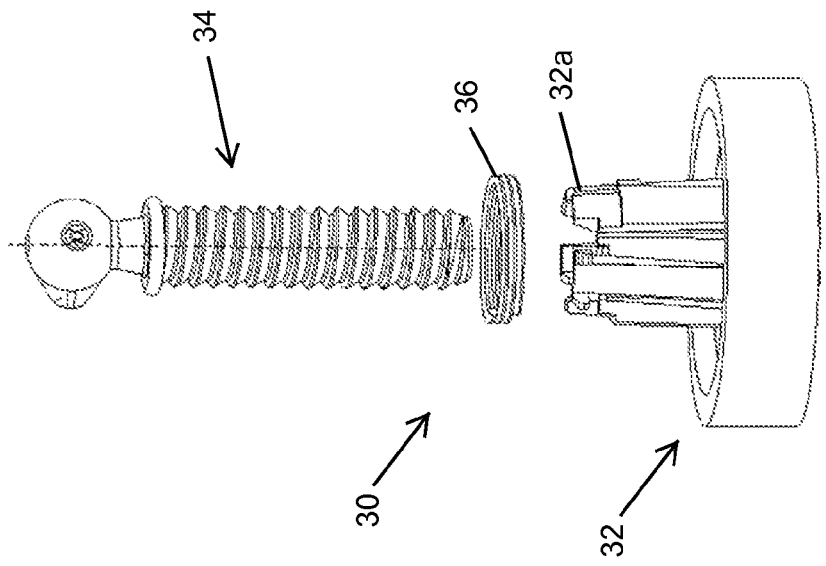
FIG. 3 is an exploded view of the clutch assembly of FIG. 2.
Figure 2:
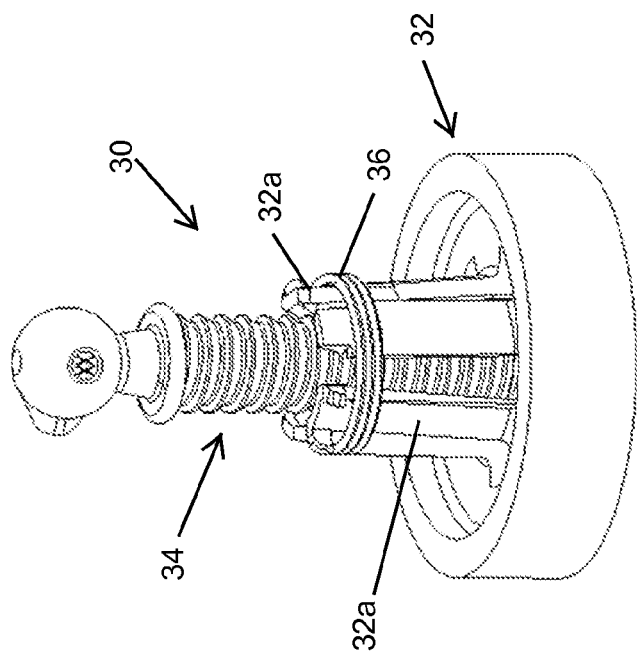
FIG. 2 is a perspective view of a known clutch assembly for a mirror actuator for adjusting a reflective element of an exterior rearview mirror assembly.

For example, and as shown in FIGS. 2 and 3, a clutch mechanism 30 may include a molded drive gear 32 disposed around a drive screw or post 34 (that is rotatably driven to move inwards and outwards relative to the molded drive gear 32 and that is pivotally mounted at the adaptor plate of the actuator that attaches at the rear of the mirror reflective element such that inward and outward movement of the drive screw adjusts the plane of the reflective element). The drive gear 32 includes a plurality of flexible fingers or protrusions 32a that each has a tooth for engaging the threads along the drive screw 34. The flexible fingers 32a are flexible and expand to allow for the drive screw to be forced through the drive gear 32 in either direction. A biasing element 36 (such as a wrap spring or the like) is disposed around the flexible fingers to bias or urge them radially inward towards the drive screw. As the drive screw is pushed into the drive gear, the fingers are pushed apart, expanding the wrap spring 36. Once the fingers are expanded far enough, the drive screw is allowed to move into and through the drive gear. Once past the drive screw tooth that caused the separation, the wrap spring collapses the fingers back against the drive screw, such that manual movement or adjustment of the drive posts or screws relative to the drive gear occurs in a ratcheting manner.

Although effective, the clutch mechanisms described above may have noisy operation due to the ratcheting action, which may also reduce durability of the actuator and may produce a loose feeling to the mirror. Also, as the spring is stretched and the fingers are flexed multiple times, their resistance to manual adjustment is reduced such that the manual adjustment effort reduces with further manual adjustments of the reflective element.

Figures 4, 5:
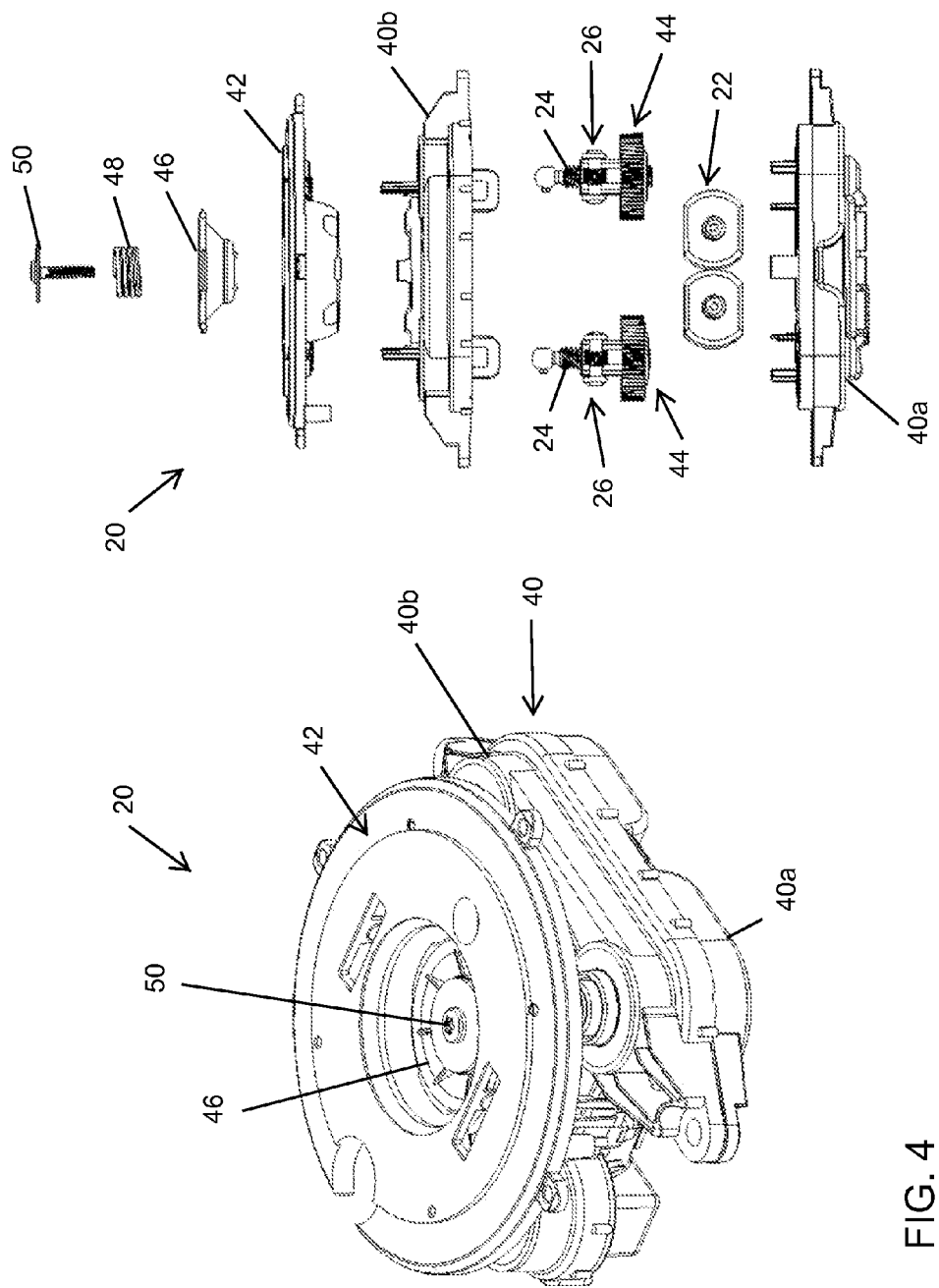
FIG. 4 is a perspective view of a mirror actuator for adjusting a reflective element of an exterior rearview mirror assembly in accordance with the present invention.
FIG. 5 is an exploded view of the mirror actuator of FIG. 4.

Referring now to FIGS. 4-8, a reflective element or mirror actuator 20 of the present invention is configured to mount in a mirror casing or head such that a base portion or housing 40 of the actuator attaches to a mirror head structure and an adapter plate 42 attaches at the back of the mirror reflective element, whereby operation of the actuator imparts pivotal movement of the reflective element relative to the mirror casing and actuator base portion. As shown in FIG. 5, actuator 20 includes a pair of motors 22, with each being operable to rotatably drive a respective drive gear assembly 44, whereby rotational driving of the drive gear assembly 44 causes rotation of a drive gear 52 about a respective drive screw 24 (which is pivotally attached at the adapter plate and is non-rotatable about its longitudinal axis), which causes the drive screw to move longitudinally along its longitudinal axis to pivot the adapter plate 42 and the reflective element to adjust the rearward field of view of the driver of the vehicle. The motors 22 are disposed within the housing 40, which includes a lower or inner housing portion 40a and an upper or outer housing portion 40b, and the drive screws 24 protrude through the outer housing portion 40b and pivotally attach or engage the adapter plate 42 (such as via a rounded or ball-shaped end portion 24a of the drive screw being pivotally received in a receiving portion or socket of the adapter plate), which may be pivotally attached or disposed at the outer housing portion via a pivot cup 46, a pivot spring 48 and a pivot screw or fastener 50, which retain the adapter plate 42 at the outer housing portion 40b. The drive screws are pivotable relative to the adapter plate so that the adapter plate can pivot or tilt relative to the housing 40 of the actuator when the drive screws are independently extended or retracted, and the drive screws are attached at the adapter plate in a manner that limits or substantially precludes rotation of the drive screw about its longitudinal axis (such as via a tab or protrusion 24c at the ball-shaped end portion 24a of the drive screw 24 that is received in a corresponding notch or receptacle of the adapter plate to allow for pivotal movement of the drive screw relative to the adapter plate but not allowing rotational movement of the drive screw about its longitudinal axis), such that rotation of the gear assembly around the drive screw and while engaged with the threads or teeth of the drive screw imparts a longitudinal movement of the drive screw relative to the gear assembly. The drive gear assemblies 44 each include the clutch mechanism or assembly 26 that allows for manual movement of the drive screw in its longitudinal direction relative to the drive gear assembly, such as may occur during manual adjustment of the reflective element.

The actuator assembly or device 20 and its motors and gears may comprise any suitable rotational driving device or means, and may utilize pivotal or rotational driving devices or actuators similar to those used in reflective element actuators (such as the types described in U.S. Pat. Nos. 7,722,199;

7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, and/or U.S. patent application Ser. No. 11/504,353, filed Aug. 15, 2006 and published Jan. 4, 2007 as U.S. Publication No. 2007/002477, which are hereby incorporated herein by reference in their entireties), or may utilize rotational driving devices similar to those used in power fold mirror applications (such as the types described in U.S. Pat. Nos. 7,314,285; 7,267,449; 7,159,992; 7,093,946; 6,312,135; 6,243,218; and 5,703,731, which are hereby incorporated herein by reference in their entireties.

Figure 7:
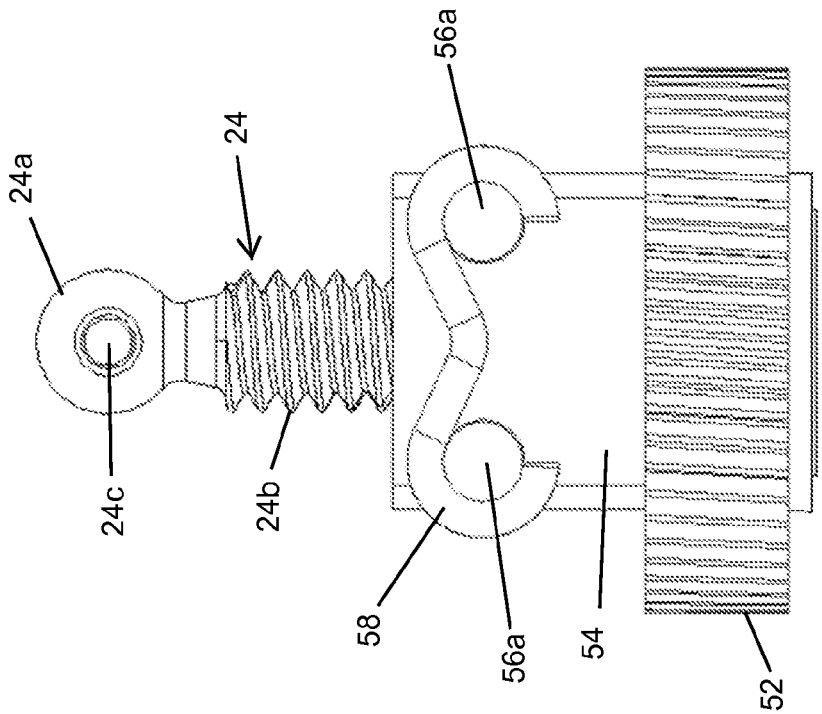
FIG. 7 is a side elevation of the clutch assembly of FIG. 6.
Figure 6:
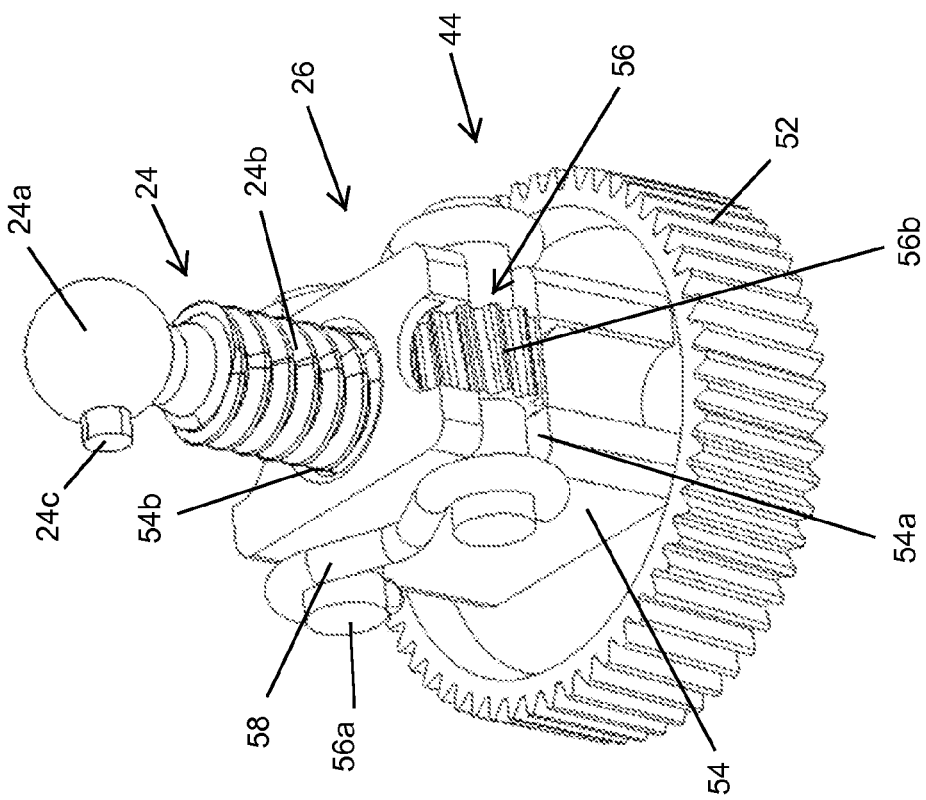
FIG. 6 is a perspective view of a clutch assembly of the mirror actuator of FIG. 5.
Figure 8:
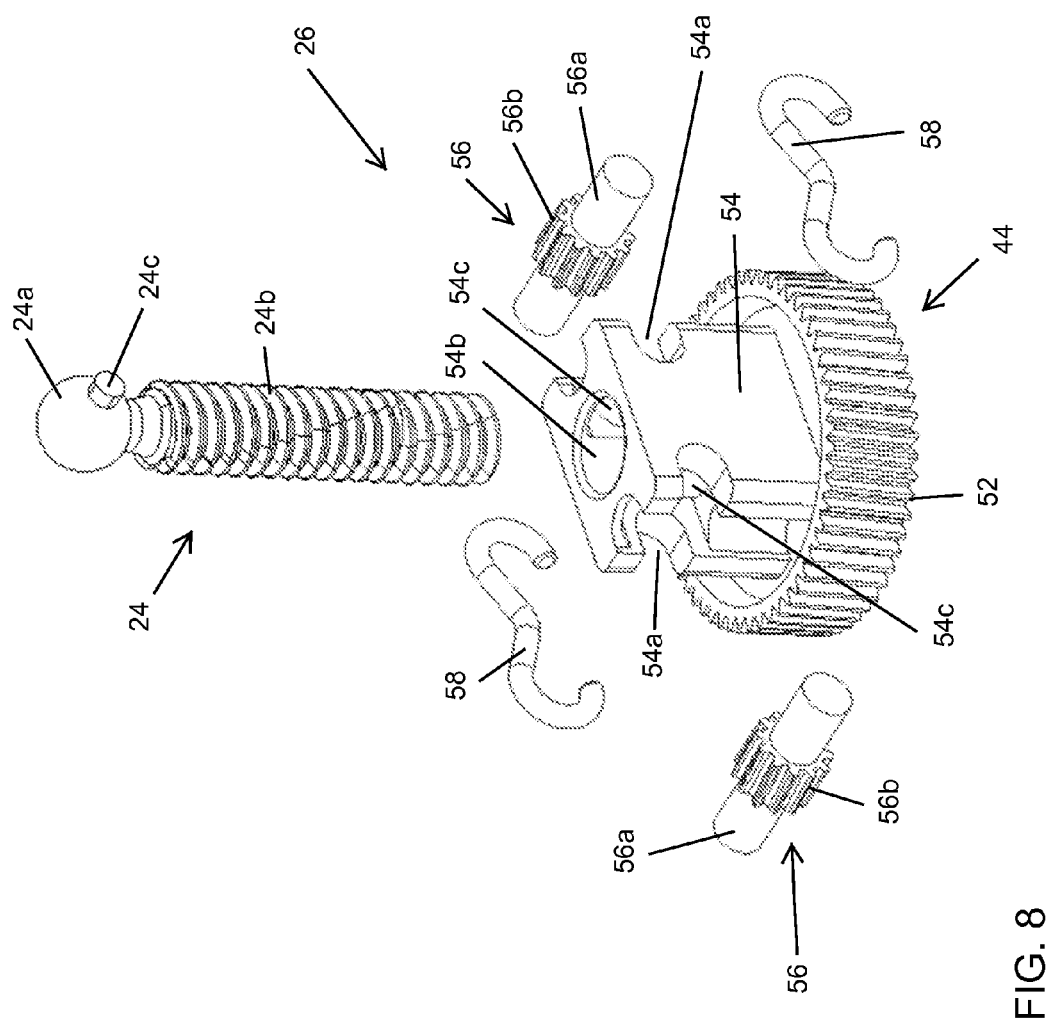
FIG. 8 is an exploded perspective view of the clutch assembly of FIG. 6.

As best shown in FIGS. 6-8, gear assembly 44 includes a ring gear or drive gear 52 for engaging a worm gear at the drive shaft of the respective motor 22. The drive gear 52 includes a molded or otherwise formed drive screw receiving portion 54 that receives the drive screw 24 therein (such as through a passageway 54b established at least partially or substantially or entirely through the drive screw receiving portion 54). The drive screw receiving portion 54 includes or supports a pair of clutch gears or helicals 56 that engage the threads of the shaft portion 24b of the drive screw 24. The rotation of the drive gear 52 and drive screw receiving portion 54 also rotates the clutch gears 56 about the drive screw. The teeth of the clutch gears 56 engage the teeth or threads of the shaft portion 24b of the drive screw 24 so that when the drive gear 52 is rotated relative to the drive screw, the engaged teeth impart the longitudinal movement of the drive screw 24 along its longitudinal axis and relative to the drive gear 52 and drive screw receiving portion 54.

In the illustrated embodiment, the drive screw receiving portion 54 rotatably receives and supports a shaft portion 56a of the pair of clutch gears or helicals 56 in respective grooves or notches or receiving portions or bushings 54a of the drive screw receiving portion 54 and the clutch gears 56 are retained therein via a pair of flexible springs or biasing elements 58. When the clutch gears 56 are so disposed at the drive screw receiving portion 54, the teeth or gears 56b of the clutch gears engage the teeth of the drive screw 24 via an opening or aperture 54c established at the drive screw receiving portion 54 at or proximate to the bushings 54a. During operation of the actuator 20, the motors 22 rotatably drive the gear 52, which in turn rotates the drive screw receiving portion 54 and the clutch gears 56, whereby the teeth 56b of the clutch gears 56 move around and along the threads of the drive screw 24 to cause the drive screw to move along its longitudinal axis to adjust the reflective element. As can be seen in FIGS. 7 and 8, the rotational axes of the clutch gears 56 are generally orthogonal to the rotational axis of the drive gear 52, which has a rotational axis that is generally parallel to the longitudinal axis of the drive screw or post 24.

The clutch mechanism 26 allows for manual movement of the drive screws 24 along their longitudinal axes when the drive gear is not rotating, and allows for such manual movement of the drive screws via rotation of the clutch gears 56 and thus without any ratcheting of the drive screw along the drive gear. The silent clutch design of the present invention thus eliminates the noise and durability issues of ratcheting designs. As shown in FIGS. 5-8, the two clutch helicals or gears 56 are pulled into and retained at their bushings 54a by the two springs 58. Pulling or pushing on the drive screw 24 with enough force causes the clutch helicals 56 to rotate within their bushings 54a, which allows for movement of the drive screw relative to the drive gear and allows for a silent manual adjustment of the reflective element in a non-ratcheting manner. During electric operation of the motors, the drive screw is kept from rotating while the drive gear is rotated by the motor. In this mode, the assembly functions similar to that of a known ratcheting clutch until a force is imparted on the drive screw that is large enough to cause the clutch helicals to rotate in their bushings. Such rotation of the clutch gears or helicals may also occur at the end of travel of the drive screws and/or if the mirror reflective element hits an obstruction (or its movement is otherwise limited) during adjustment of the reflective element via the powered actuator.

Although shown and described as having a pair of clutch gears received in notches of the drive screw receiving portion of the drive gear, clearly other means may be implemented to rotatably mount or attach a gear element at a drive screw receiving portion to allow for non-ratcheting movement of the drive screw relative to the drive gear, while remaining within the spirit and scope of the present invention. For example, and with reference to FIGS. 9-11, a clutch assembly 126 includes a gear assembly 144 that includes a ring gear or drive gear 152 for engaging a worm gear at the drive shaft of the respective motor, such as in a similar manner as described above. The drive gear 152 includes a molded or otherwise formed drive screw receiving portion 154 that receives the drive screw 124 therein (such as through a passageway established at least partially or substantially or entirely through the drive screw receiving portion 154). The drive screw receiving portion 154 includes or supports a pair of clutch gears or helicals 156 that engage the threads of the shaft portion 124b of the drive screw 124, such as in a similar manner as described above. As discussed above, the rotation of the drive gear 152 and drive screw receiving portion 154 also rotates the clutch gears 156 about the drive screw 124, and the teeth of the clutch gears 156 engage the teeth or threads of the shaft portion 124b of the drive screw 124 so that when the drive gear 152 is rotated relative to the drive screw, the engaged teeth impart the longitudinal movement of the drive screw 124 along its longitudinal axis and relative to the drive gear 152 and drive screw receiving portion 154.

In the illustrated embodiment, the drive screw receiving portion 154 rotatably receives and supports a tapered or conical end portion 156a of the pair of clutch gears or helicals 156 in respective grooves or notches or receiving portions or bushings 154a of the drive screw receiving portion 154 and the clutch gears 156 are retained therein via the receiving portion 154, which has a coil or wrap spring 158 disposed thereat to bias or urge the arms or tabs 154a of the receiving portion 154 radially inward to retain the clutch gears 156 at the receiving portion 154. For example, the receiving portion 154 may be shaped or formed so that the conical or tapered ends 156a of the clutch gears 156 are received in correspondingly formed portions of the receiving portion and tabs or arms 154a, such that when the spring 158 is disposed around the receiving portion 154, the arms and the receiving portion limit movement of the gears 156 in the direction along the longitudinal axis of the drive screw or post 124. The spring 158 may be retained in its position around the receiving portion 154 via one or more tabs 159 formed or established at an end portion of the receiving portion 154. In the illustrated embodiment, and as can be seen with reference to FIG. 11, the arms or tabs 154a have a partial conical receiving portion 154b while the receiving portion 154 may also have a partial conical surface 154c, whereby, when the gears 156 are received at the receiving portion 154, the conical ends 156a nest in or at the partial conical surfaces so as to be rotatably disposed at the drive screw receiving portion 154, with the teeth or gear 156b of the clutch gears 156 being disposed at an aperture or opening in the base or receiving portion so as to be engagable with the teeth or threads of the drive screw.

Figure 11:
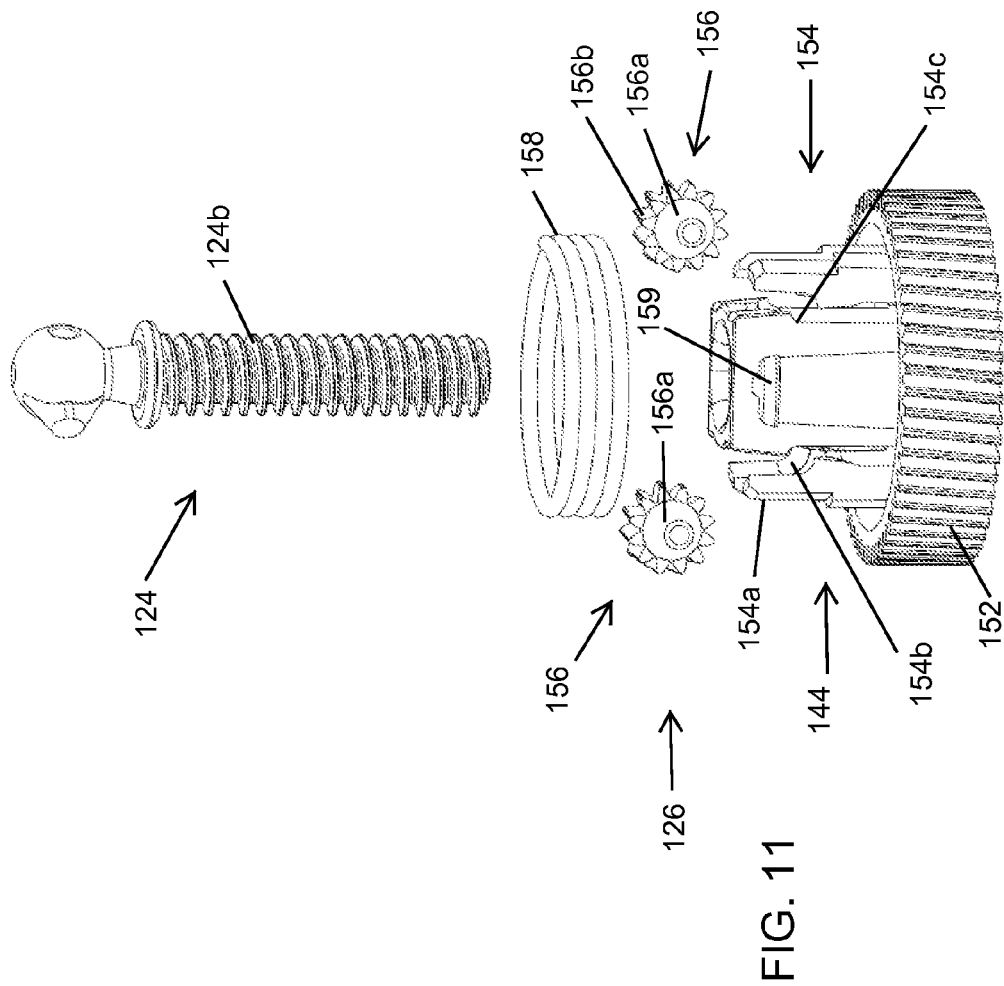
FIG. 11 is an exploded perspective view of the clutch assembly of FIG. 9.

When the clutch gears 156 are disposed at the drive screw receiving portion 154, the teeth or gears 156b of the clutch gears 156 engage the teeth of the drive screw 124 via an opening or aperture established at the drive screw receiving portion 154 at or proximate to the clutch gears. During operation of the actuator, the motors rotatably drive the gear 152, which in turn rotates the drive screw receiving portion 154 and the clutch gears 156, whereby the teeth 156b of the clutch gears 156 move around and along the threads of the drive screw 124 to cause the drive screw to move along its longitudinal axis to adjust the reflective element. As can be seen in FIGS. 9-11, the rotational axes of the clutch gears 156 are generally orthogonal to the rotational axis of the drive gear 152, which has a rotational axis that is generally parallel to the longitudinal axis of the drive screw or post 124.

The clutch mechanism 126 allows for manual movement of the drive screws 124 along their longitudinal axes when the drive gear is not rotating, and allows for such manual movement of the drive screws via rotation of the clutch gears 156 and thus without any ratcheting of the drive screw along the drive gear. The silent clutch design of the present invention thus eliminates the noise and durability issues of ratcheting designs. As shown in FIGS. 9-11, the two clutch gears 156 are pulled into and retained at the receiving portion 154 by the spring 158 engaging the tabs or arms 154a. Pulling or pushing on the drive screw 124 with enough force causes the clutch gears 156 to rotate within their receptacles or bushings at the receiving portion, which allows for movement of the drive screw relative to the drive gear and allows for a silent manual adjustment of the reflective element in a non-ratcheting manner. During electric operation of the motors, the drive screw is kept from rotating while the drive gear is rotated by the motor. In this mode, the assembly functions similar to that of a known ratcheting clutch until a force is imparted on the drive screw that is large enough to cause the clutch gears to rotate in their bushings. Such rotation of the clutch gears may also occur at the end of travel of the drive screws and/or if the mirror reflective element hits an obstruction (or its movement is otherwise limited) during adjustment of the reflective element via the powered actuator.

Figure 13:
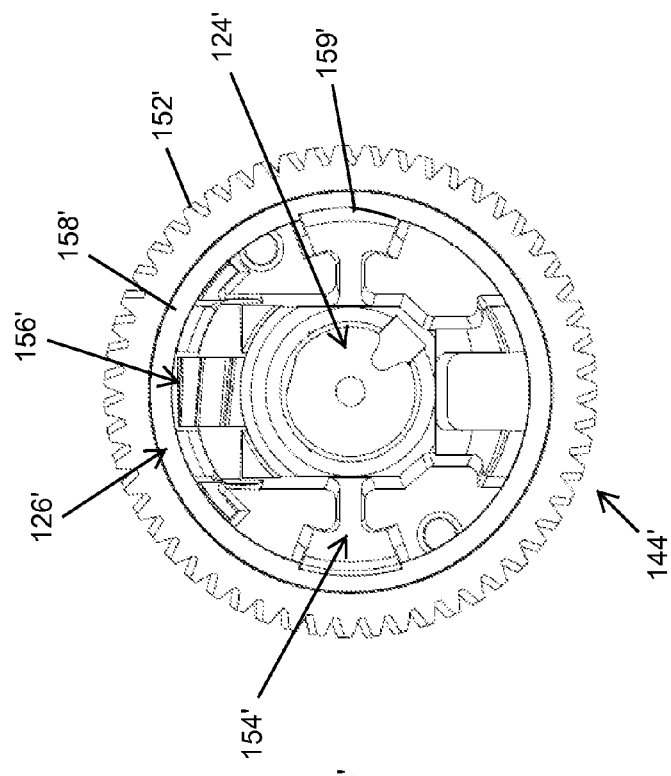
FIG. 13 is a plan view of the clutch assembly of FIG. 12.
Figure 12:
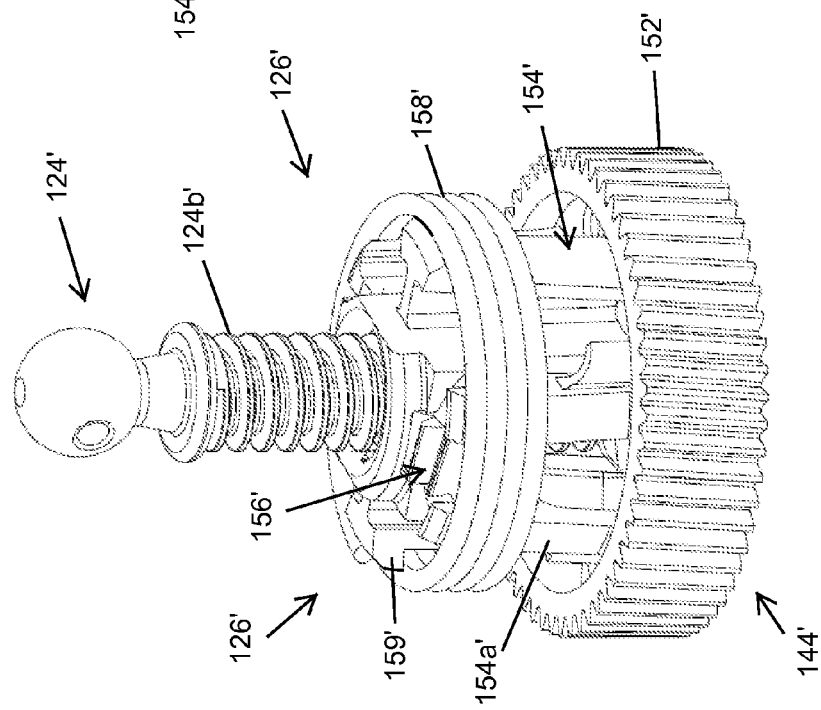
FIG. 12 is a perspective view of another clutch assembly of the present invention.
Figure 14:
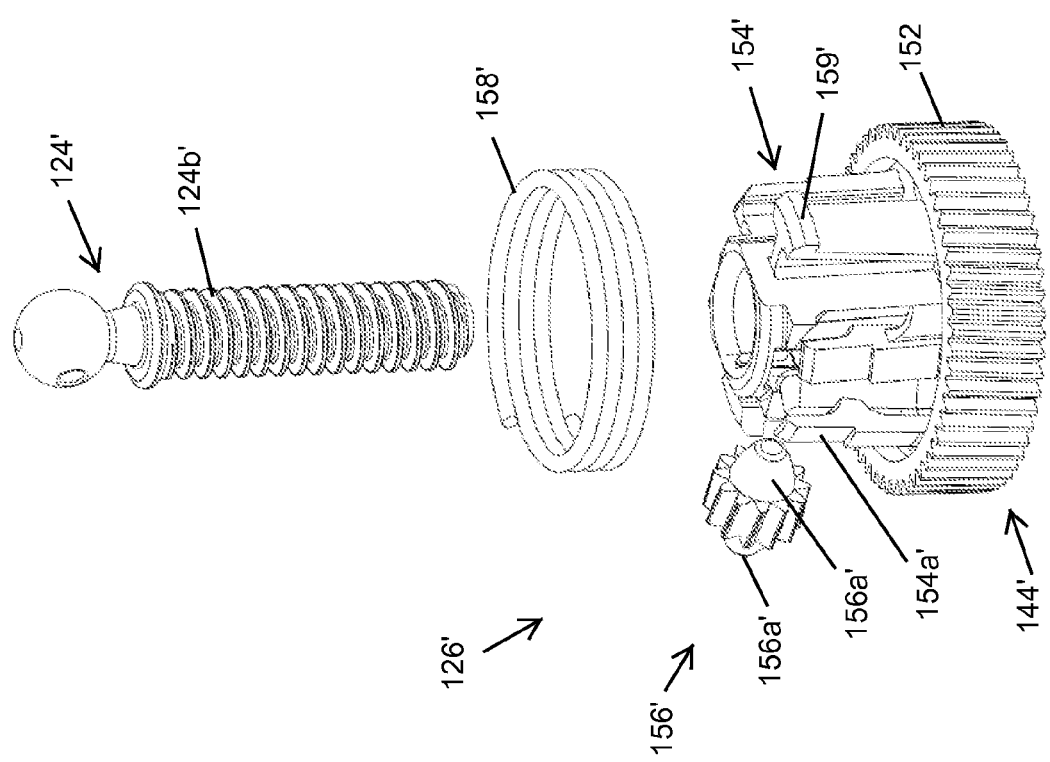
FIG. 14 is an exploded perspective view of the clutch assembly of FIG. 12.

Although shown and described as having two clutch gears disposed at opposite sides of the receiving portion and drive screw or post, the clutch assembly of the present invention may include more or less clutch gears disposed at or around the drive screw or post, while remaining within the spirit and scope of the present invention. For example, and with reference to FIGS. 12-14, a clutch assembly 126' may include a single clutch gear or helical 156' disposed at arms or tabs 154a' of a drive screw receiving portion 154' of a drive gear 152' of a gear assembly 144', whereby the single clutch gear or helical 156' is retained thereat via the shape of the arms or tabs 154a' and receiving portion 154' and via a wrap spring 158'. The spring 158' may be retained in its position around the receiving portion 154' via one or more tabs 159' formed or established at an end portion of the receiving portion 154'. The single clutch gear 156' engages the teeth or threads of the shaft portion 124b' of the drive screw or post 124', such as in a similar manner as described above. The clutch assembly 126' may function in a substantially similar manner as clutch assemblies 26, 126, discussed above, such that a detailed discussion of the clutch assemblies need not be repeated herein.

Figure 16:
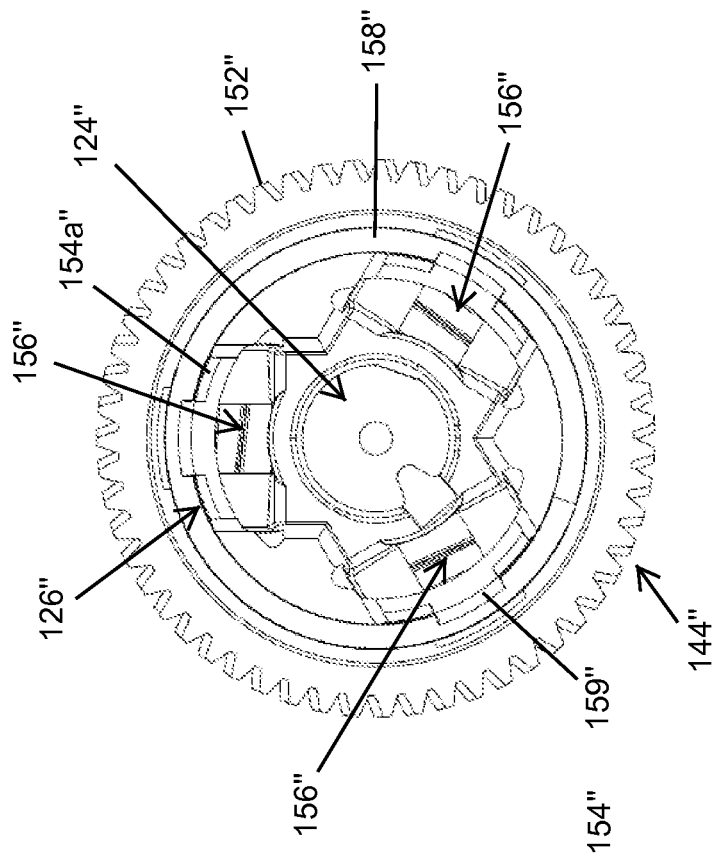
FIG. 16 is a plan view of the clutch assembly of FIG. 15.
Figure 15:
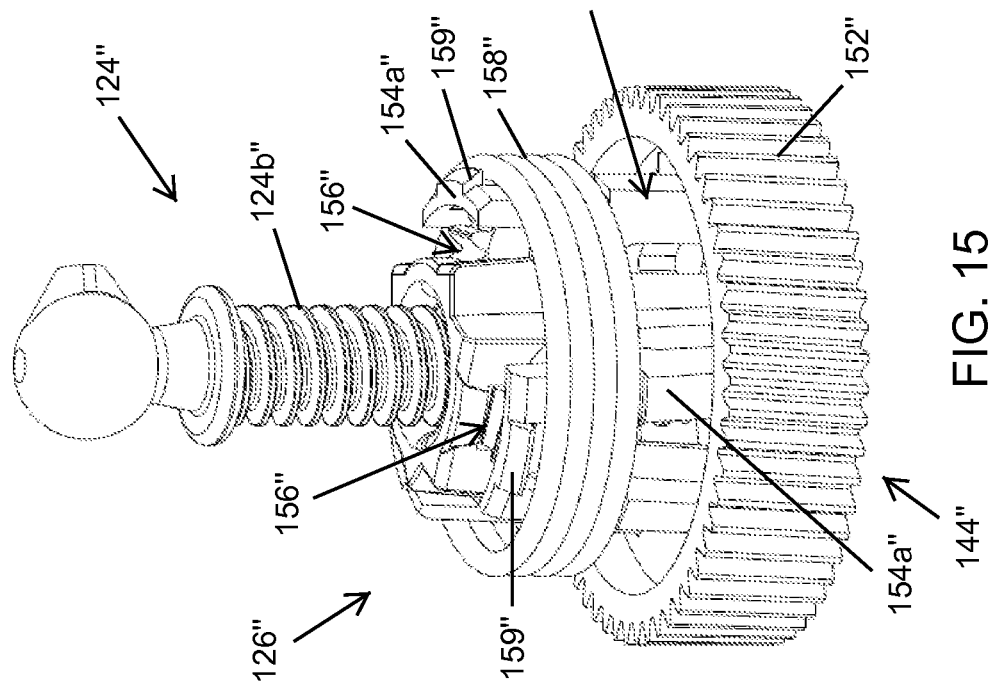
FIG. 15 is a perspective view of another clutch assembly of the present invention.
Figure 17:
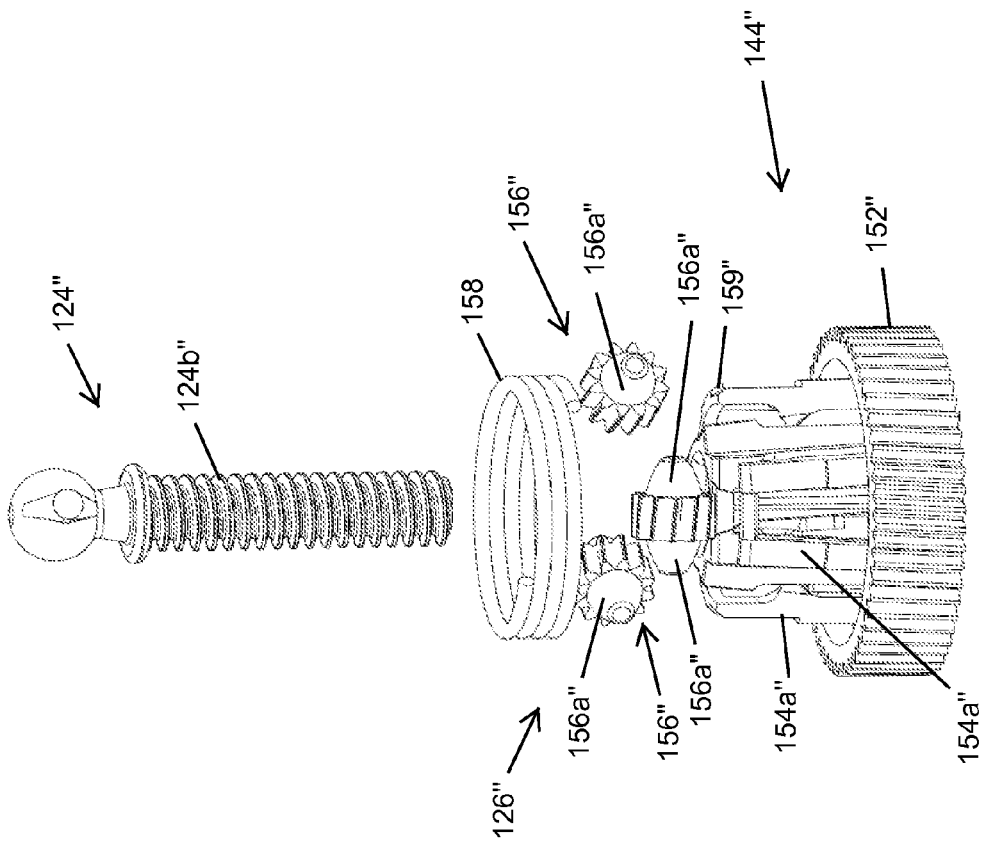
FIG. 17 is an exploded perspective view of the clutch assembly of FIG. 15.

Optionally, the clutch assembly may include more than two clutch gears or helicals disposed at and around the drive screw or post. For example, and with reference to FIGS. 15-17, a clutch assembly 126" may include three clutch gears or helicals 156" disposed at respective arms or tabs 154a" of a drive screw receiving portion 154" of a drive gear 152" of a gear assembly 144", whereby the three clutch gears or helicals are retained thereat via the shape of the arms or tabs 154a" and receiving portion 154" and via the wrap spring 158". The spring 158" may be retained in its position around the receiving portion 154" via one or more tabs 159" formed or established at an end portion of the tabs or arms 154a", which may be joined at their ends to form or provide the tabs 159" at the joined ends of the arms at each of the clutch gears 156". The clutch gears 156" engage the teeth or threads of the shaft portion 124b" of the drive screw or post 124", such as in a similar manner as described above. The clutch assembly 126" may function in a substantially similar manner as clutch assemblies 26, 126, discussed above, such that a detailed discussion of the clutch assemblies need not be repeated herein. Although shown and described as having three clutch gears or helicals, four or more clutch gears or helicals may be disposed at or mounted at the drive screw receiving portion via any suitable rotational mounting means, while remaining within the spirit and scope of the present invention.

Optionally, the mirror reflector or reflective element may comprise a generally planar glass mirror substrate or substrates (or may comprise a bent or curved substrate or substrates) and may comprise a variably reflective, electro-optic reflective element (having a front and rear substrate with an electro-optic medium sandwiched therebetween) or a single substrate reflective element (such as a planar or curved or bent glass reflective element), while remaining within the spirit and scope of the present invention. The reflective element has a reflector coating for reflecting light incident thereon to provide a rearward field of view to the driver of the vehicle. The reflector coating is disposed at an appropriate surface of the reflective element.

For example, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,626,749; 7,338,177; 7,274,501; 7,255,451; 7,195,381; 7,184,190; 7,004,592; 6,690,268; 6,420,036; 6,286,965; 6,196,688; 6,178,034; 6,154,306; 6,065,840; 6,002,544; 5,910,854; 5,751,489; 5,724,187; 5,668,663; 5,610,756; 5,567,360; 5,535,056; 5,525,264; 5,406,414; 5,253,109; 5,151,816; 5,142,407; 5,140,455; 5,117,346; 5,076,673; 5,073,012; and/or 4,712,879, and/or U.S. patent application Ser. No. 11/226,628, filed Sep. 14, 2005 and published Mar. 23, 2006 as U.S. Publication No. US-2006-0061008, and/or PCT Application No. PCT/US2010/029173, filed Mar. 30, 2010 and published Oct. 7, 2010 as International Publication No. WO 2010/114825, and/or PCT Application No. PCT/US10/32017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are hereby incorporated by reference herein in their entireties. Optionally, the reflective element may include a perimeter metallic band, such as the types described in U.S.

Pat. Nos. 7,626,749; 7,255,451; 7,274,501 and 7,184,190; and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the reflective element may include indicia formed at and viewable at the reflective element, such as by utilizing aspects of the reflective elements described in U.S. Pat. No. 7,626,749, which are all hereby incorporated herein by reference in their entireties.

Optionally, the reflective element may comprise a single substrate with a reflective coating at its rear surface. The mirror assembly thus may comprise a prismatic mirror assembly or planar or non-planar mirror or other mirror having a single substrate reflective element, such as a mirror assembly utilizing aspects of the mirror assemblies described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the reflective element may comprise a conventional prismatic or flat reflective element or prism, or may comprise a prismatic or flat reflective element of the types described in U.S. Pat. Nos. 7,184,190; 7,249,860; 7,255,451; 7,274,501; 7,289,037; 7,338,177; 7,420,756; and/or 7,626,749, which are all hereby incorporated herein by reference in their entireties.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties).

Optionally, the mirror assembly and/or reflective element may include a wide angle reflector or blind spot viewing aid or the like to provide a wide angle field of view of the blind spot area at the side of the vehicle to the driver of the vehicle. Optionally, for example, the mirror assembly may utilize aspects of the reflectors or assemblies described in U.S. Pat. Nos. 7,748,856; 7,255,451; 7,195,381; 6,717,712; 6,315,419; 7,097,312; 6,522,451; and/or 7,126,456, and/or U.S. patent application Ser. No. 12/187,725, filed Aug. 27, 2008, now U.S. Pat. No. 8,786,704, which are hereby incorporated herein by reference in their entireties.

Optionally, the mirror head portion or mirror casing or a back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflective element may comprise a bezeless or frameless reflective element (such as the types described in U.S. Pat. Nos. 7,626,749; 7,184,190 and/or 7,255,451; and/or U.S. patent application Ser. No. 11/226,628, filed Sep. 14, 2005 and published Mar. 23, 2006 as U.S. Publication No. US-2006-0061008, which are hereby incorporated herein by reference in their entireties), whereby the back plate may not include a perimeter framing portion or bezel portion around the perimeter of the reflective element.

Optionally, and desirably, the mirror assembly may include a heater element that is disposed at or established at the rear surface of the reflective element to reduce fogging of the reflective element. The heater pad or element at the rear surface of the glass substrate may provide an anti-fogging of de-fogging feature to the exterior mirror assembly, and may utilize aspects of the heater elements or pads described in U.S. Pat. No. 7,400,435 and/or PCT Application No. PCT/US07/82099, filed Oct. 22, 2007 and published on May 2, 2008 as International Publication No. WO 2008/051910, and/or U.S. patent application Ser. No. 13/111,407, filed May 19, 2011 and published Nov. 24, 2011 as U.S. Publication No. US-2011-0286096, which are hereby incorporated herein by reference in their entireties). The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

Optionally, the mirror assembly may include an indicator or illumination source (such as for backlighting an indicator or indicia at the reflective element), such as by utilizing aspects of the mirror assemblies described in U.S. Pat. Nos. 8,058,977; 7,855,755; 7,492,281; 6,919,796; 6,198,409; 5,929,786; and 5,786,772, which are hereby incorporated herein by reference in their entireties. Optionally, other illumination sources may be included, such as for illuminating a side region at or adjacent to the vehicle or illuminating other regions exterior of the vehicle, such as by utilizing aspects of the mirror assemblies described in U.S. Pat. Nos. 6,669,267; 6,969,101; 6,824,281; 7,188,963; and/or 8,333,492, and/or U.S. patent application Ser. No. 13/249,433, filed Sep. 30, 2011, now U.S. Pat. No. 8,764,256, which are hereby incorporated herein by reference in their entireties.

Optionally, the mirror assembly may include a blind spot indicator and/or a turn signal indicator, such as an indicator or indicators of the types described in U.S. Pat. Nos. 8,058,977; 7,944,371; 7,492,281; 6,198,409; 5,929,786; and 5,786,772, which are hereby incorporated herein by reference in their entireties. The signal indicator or indication module may include or utilize aspects of various light modules or systems or devices, such as the types described in U.S. Pat. Nos. 8,058,977; 7,626,749; 7,581,859; 7,255,451; 6,227,689; 6,582,109; 5,371,659; 5,497,306; 5,669,699; 5,823,654; 6,176,602; and/or 6,276,821; and/or U.S. patent application Ser. No. 12/187,725, filed Aug. 7, 2008, now U.S. Pat. No. 8,786,704, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,720,580; 7,492,281; 7,038,577; 6,882,287; 6,198,409; 5,929,786; and 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786; and/or 5,786,772, and/or U.S. patent applications, and/or U.S. provisional application Ser. No. 60/618,686, filed Oct. 14, 2004 by Laubinger, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 7,005,974; and/or 6,757,109, and/or of the automatic headlamp controls described in U.S. Pat. Nos. 7,526,103; 5,796,094 and/or 5,715,093, and/or of the rain sensors described in U.S. Pat. Nos. 6,250,148 and 6,341,523, and/or of other imaging systems, such as the types described in U.S. Pat. Nos. 6,353,392 and 6,313,454, and/or PCT Application No. PCT/US2010/25545, filed Feb. 16, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,339,149; 5,550,677; 5,760,962; 6,097,023 and 5,796,094, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

The signal indicator or indication module of the exterior rearview mirror assembly may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602; and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the illumination module may also comprise a ground illumination light or puddle lamp, which provides downwardly directed illumination (and which may provide a back lit icon or indicia or logo or the like), such as by utilizing aspects of the illumination systems described in U.S. Pat. Nos. 5,371,659, 5,669, 699, 5,823,654; 5,497,305; and/or 8,333,492, which are hereby incorporated herein by reference in their entireties. Optionally, the illumination module or device of the exterior rearview mirror assembly may comprise a cornering light and a puddle lamp and turn signal light, and may have a wraparound style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Optionally, the exterior rearview mirror assembly may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/CA12/00378, filed Apr. 25, 2012, and/or U.S. patent application Ser. No. 13/333, 337, filed Dec. 21, 2011 and published Jun. 28, 2012 as U.S. Publication No. US-2012-0162427, which are hereby incorporated herein by reference in their entireties).

Optionally, the mirror assembly may include one or more displays, such as the types disclosed in U.S. Pat. Nos. 5,530, 240 and/or 6,329,925, which are hereby incorporated herein by reference in their entireties, and/or display-on-demand or transflective type displays, such as the types disclosed in U.S. Pat. Nos. 7,370,983; 7,274,501; 7,255,451; 7,184,190; 7,195, 381; 6,690,268; 5,668,663 and/or 5,724,187, and/or in U.S. patent application Ser. No. 10/538,724, filed Jun. 13, 2005 and published Mar. 9, 2006 as U.S. Publication No. US-2006-0050018, which are all hereby incorporated herein by reference in their entireties, or may include or incorporate video displays or the like, such as the types described in U.S. Pat. Nos. 7,855,755; 7,777,611; 7,370,983; and/or 6,690,268, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror assembly for a vehicle, said exterior rearview mirror assembly comprising:
    a mounting portion mountable at a side of a vehicle;
    a mirror head portion at said mounting portion, said mirror head portion comprising a mirror casing and a reflective element at least partially housed at said mirror casing;
    an actuator operable to impart pivotal movement of said reflective element relative to said mirror casing to adjust a rearward field of view of a driver of the vehicle;
    wherein said actuator comprises a drive post that is pivotally attached at said reflective element;
    wherein said actuator comprises a motor that rotatably drives a clutch device to adjust said drive post to adjust said reflective element relative to said mirror casing;
    wherein said clutch device allows for manual adjustment of said reflective element and said drive post in a non-ratcheting manner; and
    wherein said drive post is longitudinally movable along its longitudinal axis via actuation of said actuator.

2. The exterior mirror assembly of claim 1, wherein said clutch device comprises at least one clutch gear element that is rotatable about an axis that is generally orthogonal to said longitudinal axis of said drive post.

3. The exterior mirror assembly of claim 2, wherein said motor rotatably drives a drive gear element and wherein said at least one clutch gear element is rotatably mounted at said drive gear element.

4. The exterior mirror assembly of claim 3, wherein said drive gear element is rotatable about an axis that is generally parallel to an axis of said drive post.

5. The exterior mirror assembly of claim 3, wherein said drive gear element comprises a clutch mounting portion that includes at least one bushing that rotatably mounts said at least one clutch gear element.

6. The exterior mirror assembly of claim 5, wherein a biasing element biases said at least one clutch gear at said at least one bushing and wherein said biasing element limits rotation of said at least one clutch gear element relative to said clutch mounting portion of said drive gear element.

7. The exterior mirror assembly of claim 6, wherein, responsive to sufficient force along the longitudinal axis of said drive post, said at least one clutch gear element will rotate to allow for longitudinal movement of said drive post relative to said drive gear element irrespective of rotational movement of said drive gear element.

8. The exterior mirror assembly of claim 3, wherein said clutch device comprises two clutch gear elements that are rotatably mounted at said drive gear element.

9. The exterior mirror assembly of claim 8, wherein said clutch gear elements are rotatably mounted at diametrically opposite sides of a clutch mounting portion of said drive gear element.

10. The exterior mirror assembly of claim 9, wherein said drive gear element comprises teeth disposed around said clutch mounting portion for engagement with at least one gear that is driven by said motor.

11. The exterior mirror assembly of claim 1, wherein said actuator comprises two drive posts, two motors and two clutch devices.

12. An exterior rearview mirror assembly for a vehicle, said exterior rearview mirror assembly comprising:
a mounting portion mountable at a side of a vehicle;
a mirror head portion at said mounting portion, said mirror head portion comprising a mirror casing and a reflective element at least partially housed at said mirror casing;
an actuator operable to impart pivotal movement of said reflective element mirror relative to said mirror casing to adjust a rearward field of view of a driver of the vehicle;
wherein said actuator comprises a drive post that is pivotally attached at said reflective element;
wherein said actuator comprises a motor that rotatably drives a clutch device to adjust said drive post to adjust said reflective element relative to said mirror casing;
wherein said clutch device comprises a drive post receiving portion that receives said drive post at least partially therein, and wherein at least one clutch gear element of said clutch device is rotatably mounted at said drive post receiving portion;
wherein said drive post is longitudinally movable along its longitudinal axis via actuation of said actuator and rotation of said drive post receiving portion relative to said drive post;
wherein said at least one clutch gear element engages said drive post and wherein, when said drive post receiving portion is rotated about said longitudinal axis of said drive post, said clutch gear element imparts a longitudinal movement of said drive post relative to said drive post receiving portion;
wherein said at least one clutch gear element is rotatable about an axis that is generally orthogonal to said longitudinal axis of said drive post; and
wherein, responsive to a sufficient force along said longitudinal axis of said drive post, said at least one clutch gear element rotates relative to said drive post receiving portion to allow for manual adjustment of said reflective element and said drive post in a non-ratcheting manner.

13. The exterior mirror assembly of claim 12, wherein said motor rotatably drives a drive gear element attached at said drive post receiving portion, and wherein said drive gear element is rotatable about an axis that is generally parallel to said longitudinal axis of said drive post.

14. The exterior mirror assembly of claim 12, wherein a biasing element is disposed at said at least one clutch gear element and wherein said biasing element limits rotation of said at least one clutch gear element relative to said drive post receiving portion.

15. The exterior mirror assembly of claim 12, wherein, responsive to sufficient force along the longitudinal axis of said drive post, said at least one clutch gear element rotates to allow for longitudinal movement of said drive post relative to said drive post receiving portion irrespective of rotational movement of said drive post receiving portion.

16. The exterior mirror assembly of claim 12, wherein said clutch device comprises at least two clutch gear elements that are rotatably mounted at said drive post receiving portion.

17. The exterior mirror assembly of claim 12, wherein said actuator comprises two drive posts, two motors and two clutch devices.

18. An exterior rearview mirror assembly for a vehicle, said exterior rearview mirror assembly comprising:
a mounting portion mountable at a side of a vehicle;
a mirror head portion at said mounting portion, said mirror head portion comprising a mirror casing and a reflective element at least partially housed at said mirror casing;
an actuator operable to impart pivotal movement of said reflective element mirror relative to said mirror casing to adjust a rearward field of view of a driver of the vehicle;
wherein said actuator comprises a pair of spaced apart drive posts that are pivotally attached at said reflective element;
wherein said actuator comprises a pair of electrically operable motors that rotatably drive respective clutch devices to adjust respective drive posts to adjust said reflective element relative to said mirror casing;
wherein each of said clutch devices comprises a drive post receiving portion and at least one clutch gear element rotatably mounted at said drive post receiving portion;
wherein said drive post receiving portion receives said drive post at least partially therein and wherein said at least one clutch gear element is rotatable about a clutch gear axis that is generally orthogonal to said longitudinal axis of said drive post;
a biasing element disposed at said at least one clutch gear element of each of said clutch devices, wherein said biasing element limits rotation of said at least one clutch gear element about said clutch gear axis relative to said drive post receiving portion;
wherein said drive post receiving portion includes a drive gear that is rotatably driven via actuation of the respective one of said motors;

wherein said drive post is longitudinally movable along its longitudinal axis via actuation of said motor and rotation of said drive gear and said drive post receiving portion relative to said drive post;

wherein said at least one clutch gear element engages said drive post and wherein, when said drive post receiving portion is rotated about said longitudinal axis of said drive post, said clutch gear element moves with said drive post receiving portion and imparts a longitudinal movement of said drive post relative to said drive post receiving portion; and wherein, responsive to a sufficient force along said longitudinal axis of said drive post, said at least one clutch gear element rotates about said clutch gear axis relative to said drive post receiving portion to allow for longitudinal movement of said drive post relative to said drive post receiving portion irrespective of rotational movement of said drive post receiving portion.

19. The exterior mirror assembly of claim 18, wherein each of said clutch devices comprises at least two clutch gear elements that are rotatably mounted at said drive post receiving portion.

\* \* \* \* \*